(12) United States Patent
Rozas et al.

(10) Patent No.: US 7,971,002 B1
(45) Date of Patent: Jun. 28, 2011

(54) MAINTAINING INSTRUCTION COHERENCY IN A TRANSLATION-BASED COMPUTER SYSTEM ARCHITECTURE

(76) Inventors: Guillermo Rozas, Los Gatos, CA (US); David Dunn, Sammamish, WA (US)

( * ) Notice: Subject to any disclaimer, the term of this patent is extended or adjusted under 35 U.S.C. 154(b) by 161 days.

(21) Appl. No.: 11/102,538

(22) Filed: Apr. 7, 2005

(51) Int. Cl.
*G06F 12/00* (2006.01)

(52) U.S. Cl. ........ 711/141; 711/144; 711/205; 711/206; 711/207; 711/119; 717/136; 717/137

(58) Field of Classification Search ................... 711/141, 711/144, 145; 717/136, 137
See application file for complete search history.

(56) References Cited

U.S. PATENT DOCUMENTS

| | | | |
|---|---|---|---|
| 5,345,576 A | 9/1994 | Lee et al. | |
| 5,412,787 A * | 5/1995 | Forsyth et al. | 711/207 |
| 5,623,633 A | 4/1997 | Zeller et al. | |
| 5,644,753 A | 7/1997 | Ebrahim et al. | |
| 5,704,058 A | 12/1997 | Derrick et al. | |
| 5,761,468 A | 6/1998 | Emberson | |
| 5,860,111 A | 1/1999 | Martinez et al. | |
| 5,897,656 A | 4/1999 | Vogt et al. | |
| 5,953,538 A | 9/1999 | Duncan et al. | |
| 5,987,571 A * | 11/1999 | Shibata et al. | 711/141 |
| 6,088,769 A | 7/2000 | Luick et al. | |
| 6,122,714 A | 9/2000 | VanDoren et al. | |
| 6,128,701 A | 10/2000 | Malcolm et al. | |
| 6,128,702 A | 10/2000 | Saulsbury et al. | |
| 6,164,841 A * | 12/2000 | Mattson et al. | 716/1 |
| 6,199,152 B1 * | 3/2001 | Kelly et al. | 711/207 |
| 6,205,517 B1 | 3/2001 | Sugaya | |
| 6,219,745 B1 | 4/2001 | Strongin et al. | |
| 6,345,320 B1 | 2/2002 | Kawamata et al. | |
| 6,430,657 B1 * | 8/2002 | Mittal et al. | 711/138 |
| 6,438,653 B1 | 8/2002 | Akashi et al. | |
| 6,446,187 B1 * | 9/2002 | Riedlinger et al. | 711/206 |
| 6,535,960 B1 | 3/2003 | Nishida et al. | |
| 6,546,464 B2 | 4/2003 | Fortuna et al. | |
| 6,594,821 B1 * | 7/2003 | Banning et al. | 717/136 |
| 6,633,958 B1 | 10/2003 | Passint et al. | |
| 6,638,653 B2 | 10/2003 | Andou et al. | |
| 6,662,277 B2 | 12/2003 | Gaither | |
| 6,668,287 B1 | 12/2003 | Boyle et al. | |
| 6,691,306 B1 * | 2/2004 | Cohen et al. | 717/139 |
| 6,751,706 B2 * | 6/2004 | Chauvel et al. | 711/122 |
| 6,785,780 B1 | 8/2004 | Klein et al. | |
| 6,868,481 B1 * | 3/2005 | Gaither et al. | 711/119 |
| 6,925,536 B2 | 8/2005 | Glasco et al. | |
| 2003/0005234 A1 | 1/2003 | Sperber et al. | |
| 2003/0005237 A1 | 1/2003 | Dhong et al. | |
| 2003/0131202 A1 | 7/2003 | Khare et al. | |
| 2003/0163745 A1 | 8/2003 | Kardach | |
| 2006/0123172 A1 * | 6/2006 | Herrell et al. | 710/269 |

OTHER PUBLICATIONS

Agarwal et al., An Evaluation of Directory Schemes for Cache Coherence, ISCA, May 30-Jun. 2, 1988, pp. 280-289.*

Jouppi, Norman P., Improving Direct-Mapped Cache Performance by the Addition of a Small Fully-Associative Cache and Prefetch Buffers, Proceedings of the 17th Annual International Symposium on Computer Architecture, at 388-397 (IEEE 1990).

(Continued)

*Primary Examiner* — Kevin L Ellis
*Assistant Examiner* — Alan Otto

(57) ABSTRACT

Methods and systems for maintaining instruction coherency in a translation-based computer system architecture are described. A translation coherence cache memory can be used to store a memory page reference that identifies a memory page. The cache memory also stores a permission bit corresponding to the memory page reference. The permission bit indicates whether the memory page comprises code that has been translated into another form.

29 Claims, 6 Drawing Sheets

OTHER PUBLICATIONS

Jim Handy, The Cache Memory Book, 1998, Academic Press, 2nd edition, p. 157.
Agarwal et al., The MIT Alewife Machine, Mar. 1999, Proceedings of the IEEE, vol. 87, No. 3, pp. 430-444.
CPU Cache. http://en.wikipedia.org/wiki/CPU_cache#Exclusive_versus_inclusive. Wikipedia, the free encyclopedia. Jan. 8, 2009.
Non Final Office Action; Mail Date Apr. 7, 2008; U.S. Appl. No. 11/439,361.
Notice of Allowance, Mail Date Jun. 12, 2009; U.S. Appl. No. 11/439,361.
Notice of Allowance, Mail Date Aug. 26, 2008; U.S. Appl. No. 11/439,361.
Notice of Allowance, Mail Date Dec. 12, 2008; U.S. Appl. No. 11/439,361.
Restriction Requirement, Mail Date Feb. 21, 2008; U.S. Appl. No. 11/439,361.
Final Office Action, Mail Date Feb. 25, 2009; U.S. Appl. No. 11/102,289.
Final Office Action, Mail Date Sep. 28, 2007; U.S. Appl. No. 11/102,289.
Non Final Office Action, Mail Date Mar. 23, 2007; U.S. Appl. No. 11/102,289.
Non Final Office Action, Mail Date May 12, 2009; U.S. Appl. No. 11/102,289.
Non Final Office Action, Mail Date Jun. 12, 2008; U.S. Appl. No. 11/102,289.
Final Office Action, Mail Date Mar. 16, 2009; U.S. Appl. No. 11/102,171.
Final Office Action, Mail Date Nov. 26, 2007; U.S. Appl. No. 11/102,171.
Non Final Office Action, Mail Date Mar. 26, 2007; U.S. Appl. No. 11/102,171.
Non Final Office Action, Mail Date Jul. 9, 2008; U.S. Appl. No. 11/102,171.
Non Final Office Action, Mail Date Jul. 27, 2006; U.S. Appl. No. 10/411,168.
Non Final Office Action, Mail Date Sep. 20, 2005; U.S. Appl. No. 10/411,168.
Non Final Office Action, Mail Date Nov. 1, 2007; U.S. Appl. No. 10/411,168.
Notice of Allowance, Mail Date Mar. 19, 2009; U.S. Appl. No. 10/411,168.
Notice of Allowance, Mail Date Apr. 12, 2007; U.S. Appl. No. 10/411,168.
Notice of Allowance, Mail Date May 23, 2008; U.S. Appl. No. 10/411,168.
Notice of Allowance, Mail Date Oct. 30, 2008; U.S. Appl. No. 10/411,168.
Restriction Requirement, Mail Date Mar. 28, 2006; U.S. Appl. No. 10/411,168.
Notice Of Allowance; Mail Date Aug. 6, 2009; U.S. Appl. No. 10/411,168.
Notice Of Allowance; Mail Date Jun. 26, 2009; U.S. Appl. No. 11/439,361.
Notice Of Allowance; Mail Date Mar. 12, 2009; U.S. Appl. No. 11/439,361.
Final Office Action; Mail Date May 10, 2010; U.S. Appl. No. 11/102,171.
Anant Agarwal; et al. "The MIT Alewife Machine" Laboratory for Computer Science, Massachusetts Institute of Technology Cambridge, Massachuseets 02139.
Non-Final Office Action Dated Dec. 2, 2009; U.S. Appl. No. 11/102,171.
Handy, Jim, "The Cache Memory Books", 1998, Academic Press, 2nd Edition, pp. 89-94.
Final Office Action Dated Jan. 27, 2010; U.S. Appl. No. 11/102,289.
Non-Final Office Action Dated Jul. 29, 2010; U.S. Appl. No. 12/624,094.
Notice of Allowance Dated Dec. 23, 2010; U.S. Appl. No. 12/624,094.

* cited by examiner

MAINTAINING INSTRUCTION COHERENCY IN A TRANSLATION-BASED COMPUTER SYSTEM ARCHITECTURE

RELATED UNITED STATES PATENT APPLICATION

This Application is related to U.S. patent application Ser. No. 11/102,289 by G. Rozas, filed on Apr. 7, 2005, entitled "Coherence Memory," assigned to the assignee of the present invention, and hereby incorporated by reference in its entirety.

BACKGROUND OF THE INVENTION

1. Field of the Invention

Embodiments of the present invention relate to computer system memory, in particular the management of memory.

2. Related Art

In a translation-based computer system architecture, instructions can be translated from their original form into a translated form. The translation may occur in either hardware or software.

Computer systems that utilize instruction translations need to maintain instruction coherence. That is, if an instruction is translated, and then the original instruction is later modified, then it is necessary to invalidate the translated instruction as it may no longer correspond to the modified instruction. However, there may not be any correlation between the address where the translated instruction resides and the address where the original instruction resides, and so an address-based scheme is not sufficient for reliably resolving this issue.

In one prior art solution, the instruction translator maintains a set of bits referred to as translation bits, or T-bits, that correspond to physical addresses. According to this solution, a translation lookaside buffer (TLB) is modified to accommodate the T-bits, and the TLB entry insertion process is modified to add the physical address-based T-bits to the linear address-based TLB.

SUMMARY OF THE INVENTION

A method or system that can maintain instruction coherence when instructions are translated, without modifications to the TLB and without modifications to the TLB entry insertion process, would be advantageous. Embodiments in accordance with the present invention provide this and other advantages.

According to one embodiment of the present invention, a translation coherence cache memory (or translation coherence memory) can be used to store a memory page reference that identifies a memory page. The cache memory also stores a permission bit corresponding to the memory page reference. The permission bit indicates whether the memory page comprises code that has been translated into another form.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

DETAILED DESCRIPTION OF THE INVENTION

Figure 1:
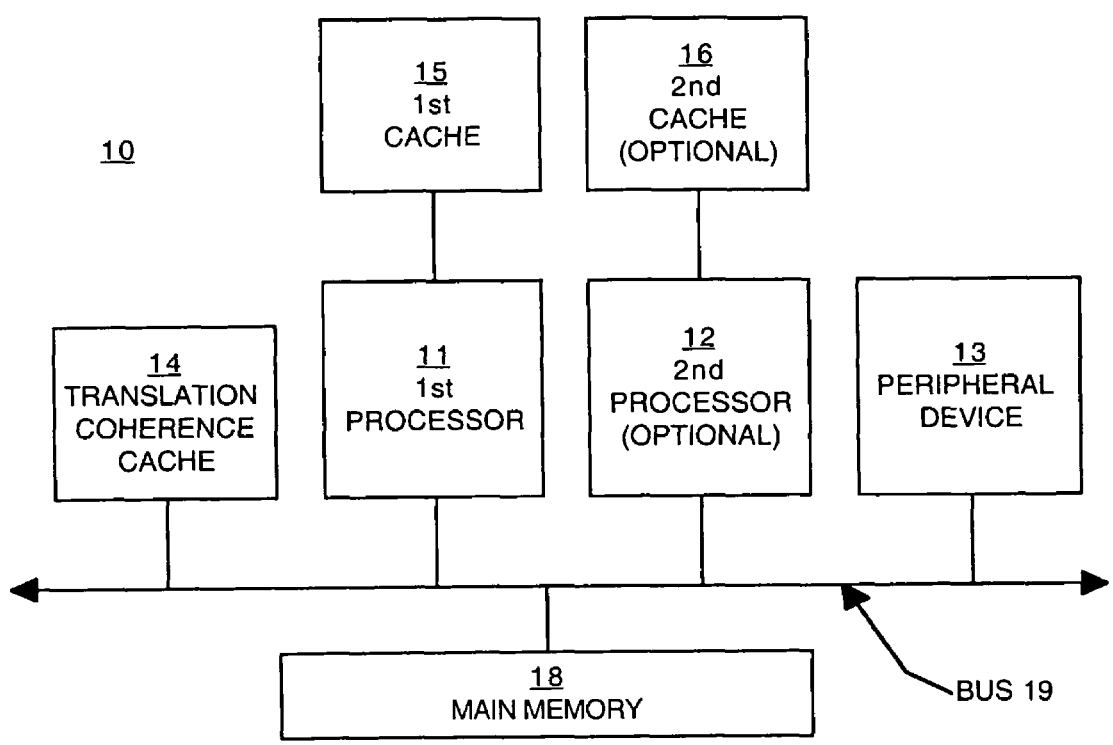
FIG. 1 is a block diagram of a portion of a first embodiment of a computer system in accordance with the present invention.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "executing," "accessing," "locating," "using," "updating," "identifying," "querying," "updating," "determining" or the like, refer to the action and processes (e.g., flowcharts 70 and 80 of FIGS. 7 and 8, respectively) of a computer system or similar intelligent electronic computing device (generally, a controller), that manipulates and transforms data represented as physical (electronic) quantities within the computer system's registers and memories into other data similarly represented as physical quantities within the computer system memories or registers or other such information storage, transmission or display devices.

FIG. 1 is a block diagram of a computer system 10 according to one embodiment of the present invention. In the example of FIG. 1, computer system 10 includes a first processor 11 and an optional second processor 12 that are coupled to main memory 18 via bus 19. In the present embodiment, computer system 10 also includes a peripheral device 13 coupled to main memory 18 via bus 19. Computer system 10 can include elements in addition to those illustrated in FIG. 1. For ease of discussion, the processors 11 and 12 and the peripheral device 13 may be collectively referred to herein as agents 11-13.

In one embodiment, peripheral device 13 is capable of direct memory access (DMA). In general, DMA refers to a hardware circuit or software agent that can transfer data directly to or from main memory 18.

Associated with the processor 11 and optional processor 12 are first cache 15 and optional second cache 16, respectively. In one embodiment, each of the processors 11-12 has their own cache. The caches may be physically incorporated into the processors 11-12, or they may be physically external to the processors 11-12. In the present embodiment, each of the processors 11-12 can access each of the caches 15-16 via bus 19.

In the embodiment of FIG. 1, computer system 10 also includes a translation coherence cache 14, which can also be referred to as translation coherence memory. In the present embodiment, translation coherence cache 14 is shared by each of the agents 11-13. Translation coherence cache 14 is shown as being a separate entity; however, the present invention is not so limited. In general, translation coherence cache 14 refers to memory for holding coherence information relevant to translations. The functionality of translation coherence cache 14 is described further in conjunction with FIG. 3.

Figure 2:
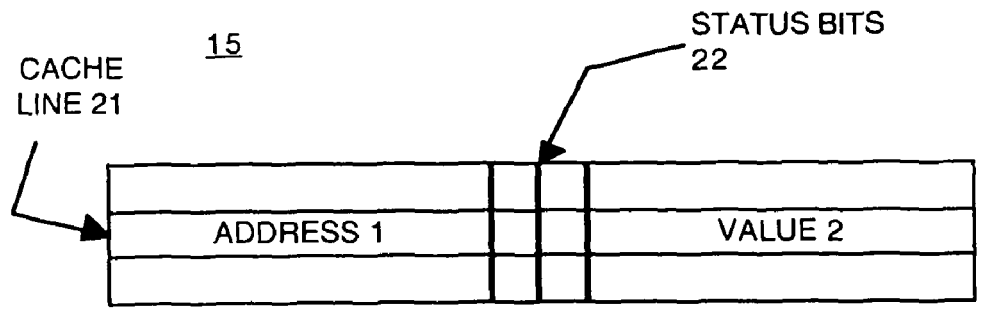
FIG. 2 is a block diagram of a cache according to one embodiment of the present invention.

FIG. 2 is a block diagram of a cache 15 according to one embodiment of the present invention. Cache 15 includes a number of cache lines exemplified by cache line 21. In the example of FIG. 2, cache line 21 includes an address 1 and a value 2. Address 1 is the address in main memory 18 (FIG. 1) for value 2.

Cache 15 also includes status bits 22; one or more status bits are associated with each cache line in cache 15. In one embodiment, computer system 10 implements a cache coherency protocol such as, but not limited to, MESI (Modified, Exclusive, Shared, Invalid). According to the MESI protocol, a cache line is identified as being in one of the modified, exclusive, shared or invalid states. In the modified state, the cache line includes more recent information than main memory 18 (only the information in the cache line is valid because main memory 18 is not up-to-date), and no other cache holds the information in the cache line. In the exclusive state, the information in the cache line is not in any other cache and the information in the cache line is unmodified, and accordingly main memory 18 is up-to-date. In the shared state, the information in the cache line may be in one or more other caches, and main memory 18 is up-to-date. In the invalid state, the cache line does not contain valid information. In one embodiment, the status bits 22 are used to indicate the state of a respective cache line according to a cache coherency protocol such as MESI.

Figure 3:
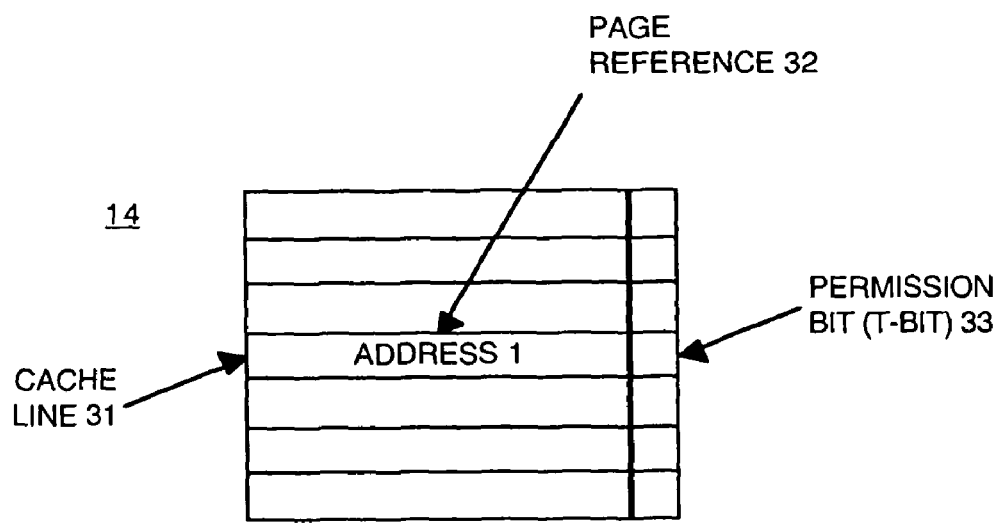
FIG. 3 is a block diagram of a translation coherence cache according to one embodiment of the present invention.

FIG. 3 is a block diagram of a translation coherence cache 14 according to one embodiment of the present invention. Translation coherence cache 14 includes a number of cache lines exemplified by cache line 31. In the present embodiment, each cache line in translation coherence cache 14 stores a page reference 32, and associated with each page reference is a permission bit 33.

Page reference 32 is a reference (e.g., an address) for a memory page in main memory 18 (FIG. 1). The memory page can include code (e.g., one or more instructions) that can be executed by any of the agents 11-13 (FIG. 1). The memory page may also include data in addition to the code.

The code on the memory page identified by page reference 32 of FIG. 3 may be translated into another form. For example, the code may be translated from a non-native language (e.g., conventional x86 or 80×86 instructions) into a native (host) language that is executed by the agents 11-13 (FIG. 1). Alternatively, the code may be self-modifying code. In general, embodiments in accordance with the present invention can be used for applications in which code in one language is translated (either in hardware or software) to another form (e.g., another language).

The permission bit 33 of FIG. 3 is used to indicate whether the code on the memory page identified by page reference 32 has been translated into another form. For example, if the permission bit 33 is set, then the code has been translated, and if the permission bit is not set (e.g., clear), then the code has not been translated. Significantly, permission bit 33 is page-based (instead of cache line-based).

Figure 4:
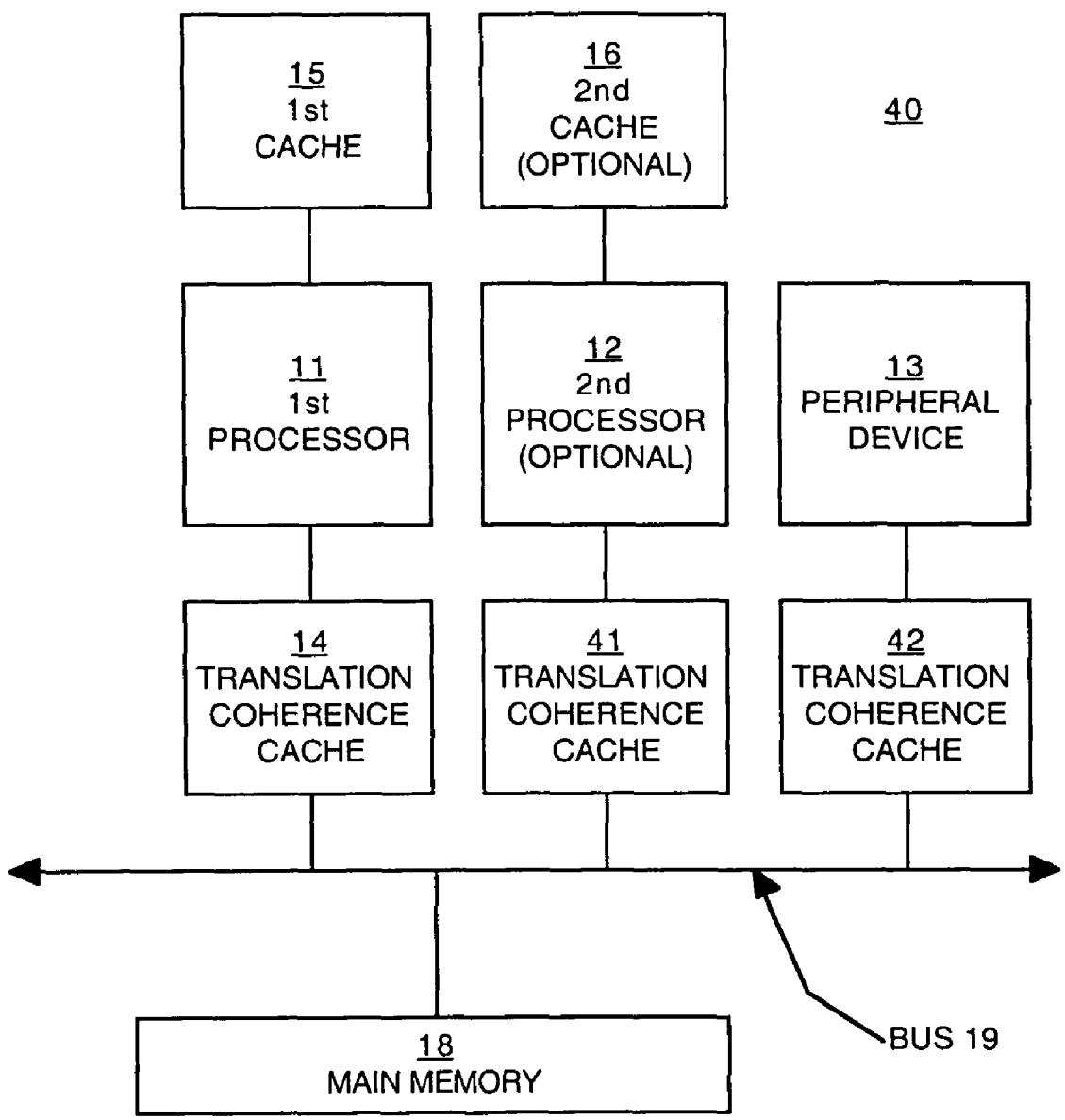
FIG. 4 is a block diagram of a portion of a second embodiment of a computer system in accordance with the present invention.

FIG. 4 is a block diagram of an embodiment of a computer system 40 in accordance with the present invention. Computer system 40 differs from computer system 10 of FIG. 1 in that computer system 40 includes a number of translation coherence caches 41 and 42 in addition to translation coherence cache 14. That is, instead of a single translation coherence cache that is shared by the agents 11-13, computer system 40 includes multiple such translation coherence caches. In the example of FIG. 4, a translation coherence cache is exclusively associated with each one of the agents 11-13. Translation coherence caches 41 and 42 are equally represented by cache 14 of FIG. 3. That is, translation coherence caches 41 and 42 include memory page references and permission bits as described for translation coherence cache 14 in conjunction with FIG. 3.

Figure 5:
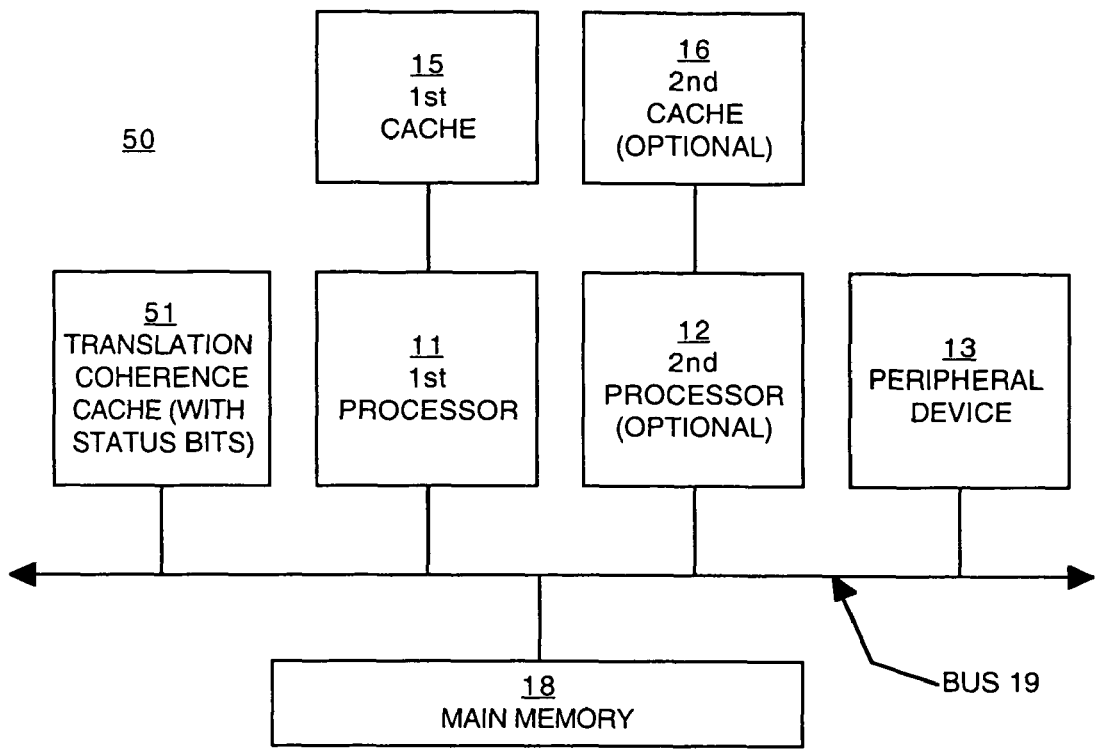
FIG. 5 is a block diagram of a portion of a third embodiment of a computer system in accordance with the present invention.

FIG. 5 is a block diagram of an embodiment of a computer system 50 in accordance with the present invention. In the example of FIG. 5, translation coherence cache 51 is for storing permissions for cache lines stored within other caches 15-16 of computer system 50. Translation coherence cache 51 does not actually store cache values or copies of data that are in main memory 18.

Translation coherence cache 51 identifies cache lines that may be cached within other caches 15-16 of computer system 50. Consequently, if a cache line is not in translation coherence cache 51, then that cache line is not in another cache 15-16. Translation coherence cache 51 may contain information for cache lines that are no longer within another cache 15-16. For example, a cache line within another cache 15-16 may have been replaced, but the cache line's tags are still present in translation coherence cache 51.

Translation coherence cache 51 functions to reduce cache handling operations. If translation coherence cache 51 is examined and a cache line is found not to be present, it is then known that the cache line is not present in any cache within computer system 50. Conversely, if the cache line is found within translation coherence cache 51 and the cache line is in the shared state, it is then known that the cache line is not in an exclusive or modified condition in any cache within computer system 50.

Figure 6:
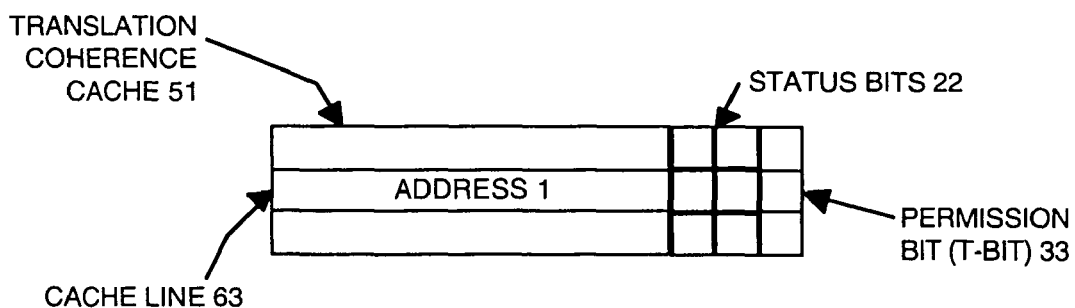
FIG. 6 is a block diagram of a translation coherence cache according to another embodiment of the present invention.

FIG. 6 is a block diagram of a translation coherence cache 51 according to one embodiment of the present invention. Translation coherence cache 51 includes a number of cache lines exemplified by cache line 63. In the present embodiment, each cache line in translation coherence cache 51 stores a memory page reference (e.g., address 1), and associated with each page reference are status bits 22 and a permission bit 33, previously described herein. Combining coherence and translation functionality in translation coherence cache 51, which has tags mapping whole memory pages, amortizes the time to access the permission bits 33 across accesses to an entire page.

Figure 7:
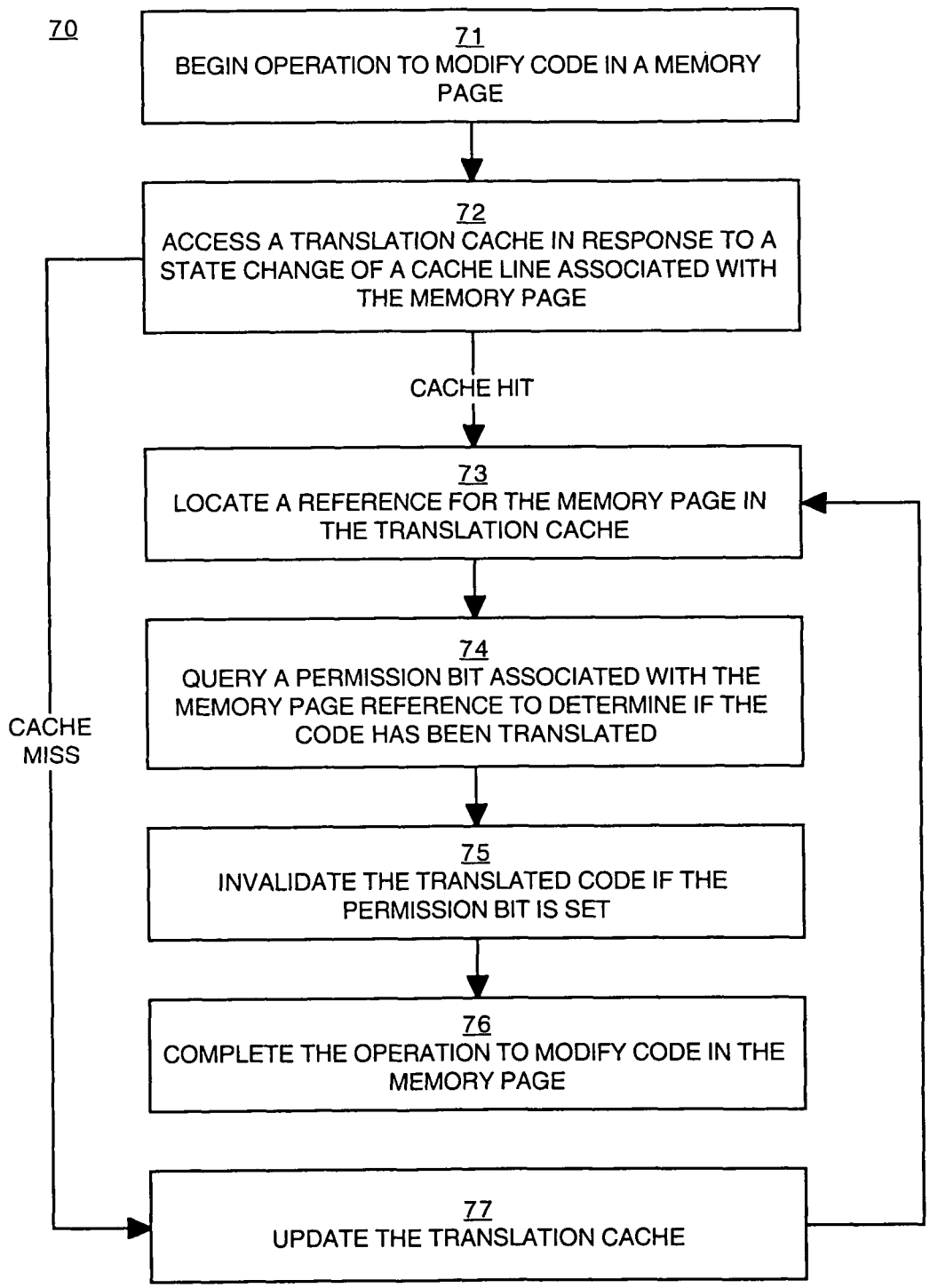
FIG. 7 is a flowchart of a method for maintaining instruction coherence in accordance with one embodiment of the present invention.
Figure 8:
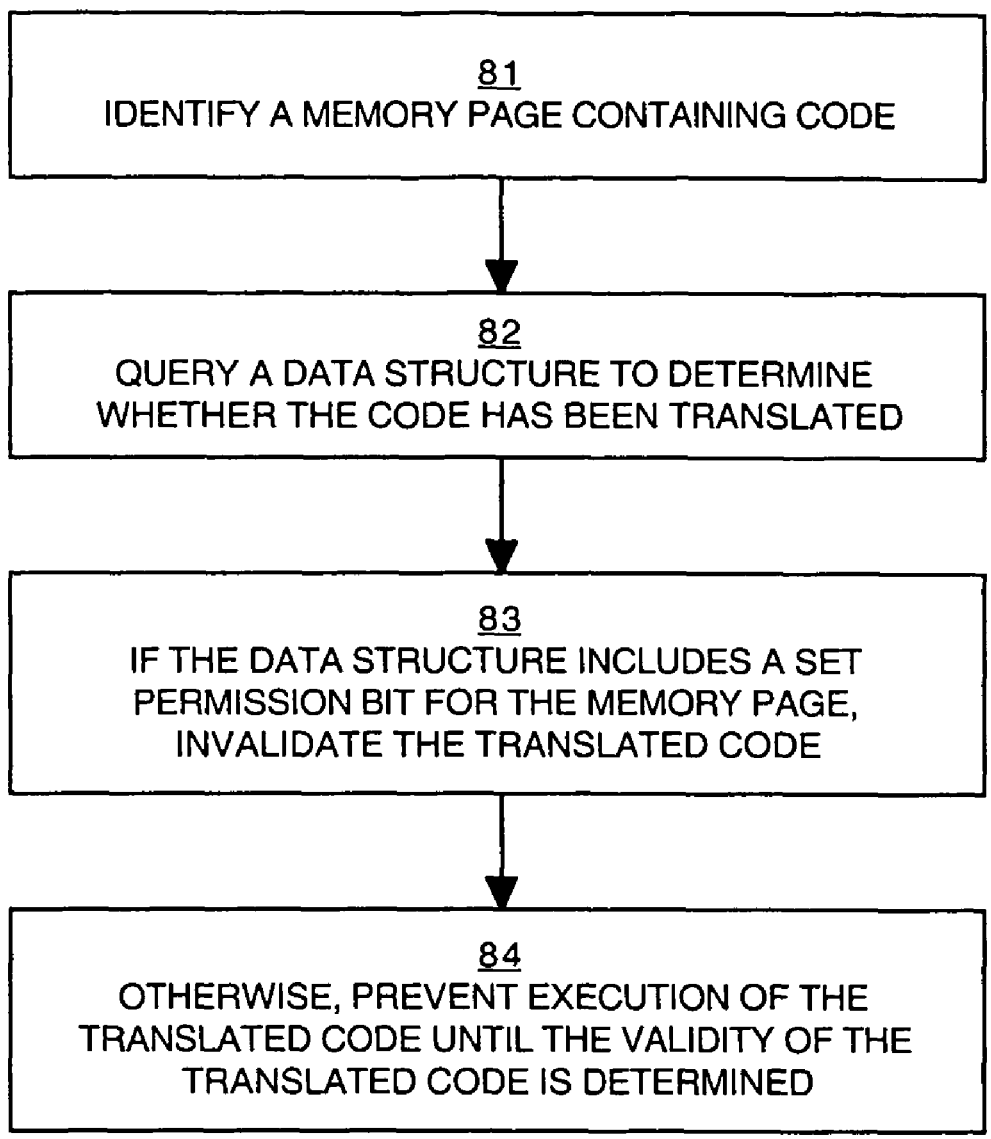
FIG. 8 is a flowchart of a method for maintaining instruction coherence in accordance with another embodiment of the present invention.

FIG. 7 is a flowchart 70 of a method for maintaining instruction coherence in accordance with one embodiment of the present invention. FIG. 8 is a flowchart 80 of a method for maintaining instruction coherence in accordance with another embodiment of the present invention. Although specific steps are disclosed in flowcharts 70 and 80, such steps are exemplary. That is, embodiments of the present invention are well-suited to performing various other steps or variations of the steps recited in flowcharts 70 and 80. It is appreciated that the steps in flowcharts 70 and 80 may be performed in an order different than presented, and that not all of the steps in flowcharts 70 and 80 may be performed. Some or all of the processes and steps of flowcharts 70 and 80 can be realized, in one embodiment, as a series of instructions that reside in hardware or software (e.g., in main memory 18) and are executed by one or more of the agents 11-13 in a computer system 10, 40 or 50 (FIGS. 1, 4 and 5).

In general, instruction coherency is maintained as follows. When a cache line (e.g., cache line 21 of FIG. 2) transitions to exclusive state (according to the MESI protocol) in order for the cache line 21 to be overwritten by a write operation, a translation coherence cache (e.g., cache 14 or 51 of FIG. 1 or 5, or the appropriate cache 14, 41 or 42 of FIG. 4, depending on which agent 11-13 is performing the write operation) is queried to determine whether the translation coherence cache includes a permission bit 33 for the memory page reference or address identified in cache line 21. If the translation coherence cache includes an entry corresponding to the memory page reference identified in cache line 21, and if the permission bit is set, then the memory page indicated by the memory page reference contains code that has been translated, and the translated code is invalidated because it is translated from a version of the code that is to be modified. If the permission bit is present and clear, then the memory page indicated by the memory page reference contains code that has not been translated.

With reference to FIG. 7, in step 71, a write operation is attempted in order to modify (overwrite) code (e.g., one or more instructions, as opposed to data) in a memory page.

In step 72, a cache (e.g., translation coherence cache 14 or 51 of FIGS. 3 and 5, respectively) is accessed (queried). In one embodiment, the translation coherence cache is accessed in response to a change in state of a cache line associated with the memory page. For example, for the write operation, the status of cache line 21 of FIG. 2 changes. In a MESI embodiment, the state of cache line 21 (indicated by status bits 22 of FIG. 2) changes to the exclusive state. In one such embodiment, the change in state triggers a snoop (query) of translation coherence cache 14 or 51. The query will result in either a cache hit or a cache miss, and a cache hit will result in a determination that the permission bit 33 (FIG. 3 and FIG. 5) is either set or clear. For a cache miss, flowchart 70 proceeds to step 77. For a cache hit, flowchart 70 proceeds to step 73.

In step 73 of FIG. 7 (in the case of a cache hit), the translation coherence cache includes a reference (e.g., an address) for the memory page that is being modified.

In step 74, the permission bit corresponding to the memory page reference in the translation coherence cache is queried.

In step 75, if the permission bit is set, then the memory page to be modified includes code that has been translated. Accordingly, the translated code is invalidated. For example, the translated code can be marked as no longer being valid.

In one embodiment, the entirety of the memory page containing the translated code is invalidated. In another embodiment, only a portion of the memory page containing the translated code is invalidated. Specifically, in the latter situation, only the part of the memory page that contains the translated code that is no longer valid is invalidated. The former situation is sometimes referred to as coarse-grained translation protection, and the latter situation is sometimes referred to as fine-grained translation protection. Coarse-grained and fine-grained translation protection are known in the art (for example, see U.S. Pat. No. 6,363,336, assigned to the assignee of the present invention, and hereby incorporated by reference in its entirety).

In step 76, the write operation to the memory page is completed. The modified code in the memory page can then be retranslated.

In step 77, in case of a cache miss, the translation coherence cache is updated from main memory 18 (e.g., FIG. 1). Specifically, permission bit information for the memory page being modified is accessed from main memory 18 and added to the translation coherence cache, along with the corresponding memory page reference.

As mentioned in the discussion above, a query of the translation coherence cache (e.g., cache 14 or 51 of FIG. 3 or 5) can result in a cache hit or a cache miss. An alternative to such a translation coherence cache protocol is to utilize a cache protocol that is definitive so that there are no cache misses, but instead accesses to the cache that encounter, for a memory page to be modified, either a permission bit that is set or clear. Because the number of pages that contain code that has been translated can exceed the size of the cache, any page whose permission bit is clear (not set in the cache) is prevented from executing.

A memory page that does not have a permission bit set in the cache is either not present in the TLBs or is not executable. In one embodiment, to prevent execution, a no-execution-allowed bit is set for the memory page. In response to a fault due to lack of execution rights, the code in the memory page is checked for integrity (to determine if it has been modified). For example, the code in the memory page can be checked against a copy of the original code to determine if it is the same (if it is the same, then the code in the memory page is valid). The memory page can then be added to the cache, and its no-execution-allowed bit can be cleared.

In the process of adding a new memory page to the cache, another memory page may need to be evicted. If so, the no-execution-allowed bit is set for any virtual-to-physical mapping of the evicted page that may be present in the TLB(s).

With reference now to FIG. 8, in step 81, a memory page to be modified is identified.

In step 82, a cache is queried in order to determine whether code in the memory page has been translated.

In step 83, if the cache includes a permission bit for the memory page that is set, then the translated code is invalidated. Otherwise, in step 84, execution of the translated code is prevented until the validity of the translated code is determined.

In summary, rather than modifying a TLB to add permission bits that identify whether or not a memory page includes code that has been translated, and instead of modifying the TLB entry insertion process to add physical address-based permission bits to the TLB, according to embodiments of the present invention the TLB is unmodified. According to embodiments of the present invention, a translation coherence cache is queried as part of a cache coherency protocol. That is, in response to a change in state of a cache line according to the cache coherency protocol, the translation coherence cache is queried. If a permission bit in the translation coherence cache is set for the memory page referenced in the cache line, then the memory page contains code that has been translated, and the translated version of the code is invalidated.

Embodiments in accordance with the present invention are thus described. While the present invention has been described in particular embodiments, it should be appreciated that the present invention should not be construed as limited by such embodiments, but rather construed according to the below claims.

What is claimed is:

1. A computer system comprising:
   a memory; and
   a translation coherence cache coupled to the memory and configured to include i) physical memory addresses but not virtual memory addresses for memory pages and ii) an indicator for individual physical memory addresses cached in the translation coherence cache, wherein the translation coherence cache is configured with indexes comprising the physical memory addresses, and wherein an indicator associated with a physical memory address in the translation coherence cache is operable for indicating whether code on a memory page identified by the physical memory address has been translated.

2. The computer system of claim 1 further comprising:
   a plurality of processors; and
   a plurality of processor caches, wherein the processor caches in the plurality of processor caches include a processor cache comprising a plurality of cache lines, wherein the cache lines in the plurality of cache lines are configured to store a respective value and a memory address for the respective value; wherein the computer system is configured so that if a particular memory address is not in the translation coherence cache then the particular memory address is also not in any of the processor caches, wherein the computer system is also configured so that a memory address added to any of the processor caches is also added to the translation coherence cache.

3. The computer system of claim 1, wherein the computer system is configured to: i) examine the translation coherence cache in response to a write operation to a specified memory address to determine whether the specified memory address is cached in the translation coherence cache; and ii) if the specified memory address is cached in the translation coherence cache, examine the indicator associated with the specified memory address to determine whether code associated with the specified memory address has been translated.

4. The computer system of claim 1, wherein if the indicator associated with the physical memory address indicates that the code has been translated to produce translated code, then the translated code is invalidated in response to a write operation to the physical memory address.

5. The computer system of claim 1, wherein if the indicator associated with the physical memory address indicates that the code has been translated to produce translated code, then the entirety of a memory page identified by the physical memory address is invalidated in response to a write operation to the physical memory address.

6. The computer system of claim 1, further comprising an input/output agent configured for direct memory access (DMA).

7. The computer system of claim 6, wherein the translation coherence cache is shared between a processor and the agent.

8. The computer system of claim 1 wherein the translation coherence cache is further configured to include cache coherency protocol status bits for the memory addresses cached in the translation coherence cache.

9. The computer system of claim 1 wherein the indicator comprises a settable permission bit configured to have a value that indicates whether the code has been translated.

10. The computer system of claim 1 further comprising:
    a processor; and
    a processor cache coupled to the processor and comprising a plurality of cache lines, wherein the computer system is configured so that if a particular memory address is not in the translation coherence cache then the particular memory address is also not in the processor cache, wherein the computer system is also configured so that a memory address added to the processor cache is also added to the translation coherence cache.

11. A method of maintaining translation coherency in a computer system, the method comprising:
    detecting a write operation to a specified memory address, wherein the specified memory address comprises a physical address for a memory page;
    determining whether the specified memory address is cached in a translation coherence cache comprising addresses for memory pages, wherein the addresses comprise physical addresses but not virtual addresses, and wherein the translation coherence cache is configured with indexes comprising the physical addresses; and
    if the specified memory address is cached in the translation coherence cache, then examining the translation coherence cache to determine whether code on the memory page identified by the specified memory address has been translated.

12. The method of claim 11 wherein the computer system further comprises a plurality of processors and a plurality of processor caches, the method comprising:
    determining whether the specified memory address is cached in the translation coherence cache instead of examining the plurality of processor caches, wherein the computer system is configured so that if a particular memory address is not in the translation coherence cache then the particular memory address is also not in any of the processor caches, wherein the computer system is also configured so that a memory address added to any of the processor caches is also added to the translation coherence cache.

13. The method of claim 12 wherein the processor caches include a processor cache comprising a plurality of cache lines, wherein the cache lines in the processor cache are configured to store a respective value and a memory address for the respective value, and wherein the translation coherence cache is configured to include a permission bit for a memory address cached in the translation coherence cache and cache coherency protocol status bits for a memory address cached in the translation coherence cache.

14. The method of claim 11, wherein the computer system further comprises an input/output agent configured for direct memory access (DMA).

15. The method of claim 14, wherein the translation coherence cache is shared between a processor and the agent.

16. The method of claim 11 further comprising, if the specified memory address is not cached in the translation coherence cache, then checking the code to determine whether the code has been translated.

17. The method of claim 16 further comprising, if the specified memory address is not cached in the translation coherence cache, then setting a no-execution-allowed bit for the memory page identified by the specified memory address.

18. The method of claim 17 further comprising, if the code has not been translated, then:
    clearing the no-execution-allowed bit; and
    adding the specified memory address to the translation coherence cache.

19. The method of claim 11, wherein the computer system is configured so that if the specified memory address is not in the translation coherence cache then the specified memory address is also not in a processor cache, wherein the computer system is also configured so that a memory address added to the processor cache is also added to the translation coherence cache.

20. The method of claim 11 wherein said examining the translation coherence cache comprises examining a permission bit associated with the specified memory address in the translation coherence cache, wherein the permission bit is configured to indicate whether the code on the memory page identified by the specified memory address has been translated.

21. The method of claim 20, wherein if the code has been translated into translated code, then the method further comprises invalidating the translated code.

22. The method of claim 20, wherein if the code has been translated into translated code, then the method further comprises invalidating the entirety of the memory page identified by the specified memory address.

23. A computer system comprising:
    a memory; and
    a translation coherence cache configured to include a permission bit for individual memory addresses cached in the translation coherence cache and cache coherency protocol status bits for individual memory addresses cached in the translation coherence cache, wherein the memory addresses cached in the translation coherence cache comprise physical addresses but not virtual addresses and wherein the translation coherence cache is configured with indexes comprising the physical addresses;
    the memory having stored therein instructions that responsive to execution cause the computer system to examine the translation coherence cache in response to a write operation to the physical memory address to determine whether the physical memory address is cached in the translation coherence cache and, if the physical memory address is cached in the translation coherence cache, also cause the computer system to examine a permission bit associated with the physical memory address in the translation coherence cache to determine whether code associated with the physical memory address has been translated, wherein the permission bit is operable for indicating whether the code has been translated.

24. The computer system of claim 23 further comprising:
    a plurality of processors; and
    a plurality of processor caches, wherein the processor caches in the plurality of processor caches include a processor cache comprising a plurality of cache lines, wherein the cache lines in the plurality of cache lines in the processor cache are configured to store a respective value and a memory address for the respective value; wherein the computer system is configured so that if a particular memory address is not in the translation coherence cache then the particular memory address is also not in any of the processor caches, wherein the computer system is also configured so that a memory address added to any of the processor caches is also added to the translation coherence cache; and wherein a write operation to a specified memory address is operable for causing examination of the translation coherence cache to determine whether the specified memory address is cached in the translation coherence cache.

25. The computer system of claim 23, further comprising an input/output agent configured for direct memory access (DMA).

26. The computer system of claim 25, wherein the translation coherence cache is shared between a processor and the agent.

27. The computer system of claim 23, wherein if the permission bit associated with the physical memory address indicates that the code has been translated to produce translated code, then the translated code is invalidated in response to the write operation.

28. The computer system of claim 23, wherein if the permission bit associated with the physical memory address indicates that the code has been translated to produce translated code, then the entirety of a memory page identified by the physical memory address is invalidated in response to the write operation.

29. The computer system of claim 23 further comprising:
    a processor; and
    a processor cache coupled to the processor and comprising a plurality of cache lines, wherein individual cache lines are configured to store a value and a memory address for the value, wherein the memory address comprises a physical memory address.

* * * * *

UNITED STATES PATENT AND TRADEMARK OFFICE
CERTIFICATE OF CORRECTION

| | | |
|---|---|---|
| PATENT NO. | : 7,971,002 B1 | Page 1 of 1 |
| APPLICATION NO. | : 11/102538 | |
| DATED | : June 28, 2011 | |
| INVENTOR(S) | : Rozas et al. | |

It is certified that error appears in the above-identified patent and that said Letters Patent is hereby corrected as shown below:

Page 2, item (56), under "Other Publications", in Column 2, Line 27, delete "Massachuseets" and insert -- Massachusetts --.

Signed and Sealed this
First Day of November, 2011

David J. Kappos
*Director of the United States Patent and Trademark Office*